(12) United States Patent
Colace et al.

(10) Patent No.: US 11,499,125 B2
(45) Date of Patent: Nov. 15, 2022

(54) WATER-SOLUBLE UNIT DOSE ARTICLE

(71) Applicant: The Procter & Gamble Company, Cincinnati, OH (US)

(72) Inventors: Gianmarco Colace, Brussels (BE); Miguel Brandt-Sanz, Tervuren (BE); Alberto Martinez-Becares, Ixelles (BE)

(73) Assignee: The Procter & Gamble Company, Cincinnati, OH (US)

( * ) Notice: Subject to any disclaimer, the term of this patent is extended or adjusted under 35 U.S.C. 154(b) by 88 days.

(21) Appl. No.: 16/996,054

(22) Filed: Aug. 18, 2020

(65) Prior Publication Data

US 2021/0062119 A1 Mar. 4, 2021

(30) Foreign Application Priority Data

Aug. 28, 2019 (EP) ..................................... 19193970
Apr. 15, 2020 (EP) ..................................... 20169589

(51) Int. Cl.
*C11D 17/04* (2006.01)
*C11D 3/37* (2006.01)
*C08J 5/18* (2006.01)
*C08L 29/04* (2006.01)

(52) U.S. Cl.
CPC ............... *C11D 17/043* (2013.01); *C08J 5/18* (2013.01); *C08L 29/04* (2013.01)

(58) Field of Classification Search
None
See application file for complete search history.

(56) References Cited

U.S. PATENT DOCUMENTS

| 2,740,771 | A | 4/1956 | Longley, Jr. |
| 3,000,848 | A | 9/1961 | Mcgary, Jr. et al. |
| 3,026,302 | A1 | 9/2011 | Shibutani |
| 8,697,624 | B2 | 4/2014 | Denome et al. |
| 9,532,578 | B2 | 1/2017 | Siddiqui |
| 10,240,114 | B2 | 3/2019 | Labeque |
| 10,307,723 | B2 | 6/2019 | Burakowska-meise |
| 10,336,973 | B2 | 7/2019 | Labeque |
| 10,450,119 | B2 | 10/2019 | Boswell |
| 10,604,631 | B2 | 3/2020 | Boswell |
| 10,604,632 | B2 | 3/2020 | Boswell |
| 10,619,042 | B2 | 4/2020 | Labeque |
| 10,703,549 | B2 | 7/2020 | Hodgdon |
| 2006/0276364 | A1 | 12/2006 | Kouvroukoglou |
| 2009/0286909 | A1 | 11/2009 | Shibutani |

(Continued)

FOREIGN PATENT DOCUMENTS

| JP | 2006282951 A | 10/2006 |
| JP | 2016020085 A | 2/2016 |

(Continued)

OTHER PUBLICATIONS

Search Report for appl. No. 20169589.7-1105, dated Oct. 9, 2020, 8 pages.

*Primary Examiner* — Lorna M Douyon
(74) *Attorney, Agent, or Firm* — Gregory S. Darley-Emerson

(57) ABSTRACT

Water-soluble unit dose article having a water-soluble film wherein the water-soluble film has a polymeric resin having a copolymer of polyvinylalcohol and 1-butene-3,4-diol and a second polyvinyl alcohol polymer.

20 Claims, 1 Drawing Sheet

(56) References Cited

U.S. PATENT DOCUMENTS

| | | |
|---|---|---|
| 2017/0226298 A1 | 8/2017 | Friedrich |
| 2017/0298216 A1* | 10/2017 | Labeque ............... C11D 17/045 |
| 2017/0298308 A1 | 10/2017 | Labeque |
| 2018/0290440 A1 | 10/2018 | Boswell |
| 2018/0291162 A1 | 10/2018 | Boswell |
| 2018/0369859 A1 | 12/2018 | Boswell |
| 2019/0002172 A1 | 1/2019 | Hodgdon et al. |
| 2019/0211289 A1 | 7/2019 | Friedrich et al. |
| 2019/0276782 A1 | 9/2019 | Labeque |
| 2020/0199314 A1 | 6/2020 | Hiura |
| 2020/0199344 A1 | 6/2020 | Labeque |

FOREIGN PATENT DOCUMENTS

| | | |
|---|---|---|
| JP | 2016121204 A | 7/2016 |
| WO | 2018187200 A1 | 10/2018 |
| WO | 2019006234 A1 | 1/2019 |

\* cited by examiner

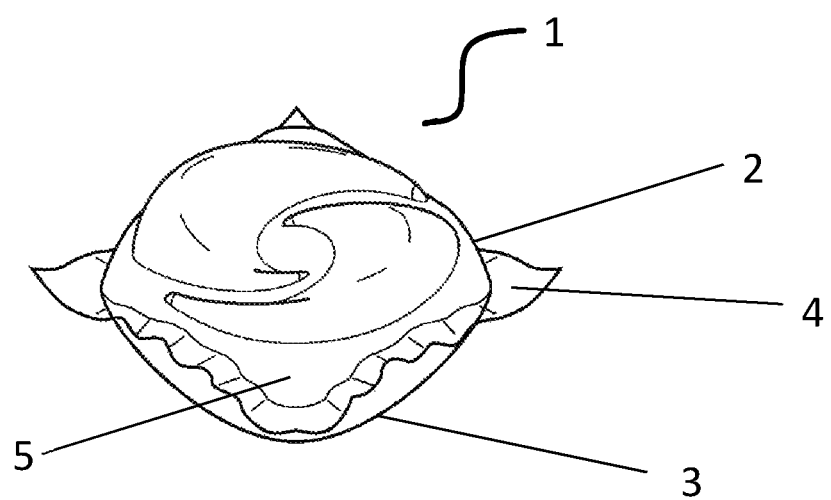

WATER-SOLUBLE UNIT DOSE ARTICLE

FIELD OF THE INVENTION

Water-soluble unit dose article having a water-soluble film wherein the water-soluble film has a polymeric resin having a copolymer of polyvinylalcohol and 1-butene-3,4-diol and a second polyvinyl alcohol polymer.

BACKGROUND OF THE INVENTION

Water-soluble unit dose articles are liked by consumers as they offer convenience and ease to the laundry process. Without wishing to be bound by theory, the water-soluble unit dose article comprises a water-soluble film and a unitized dose of a detergent composition which is housed within one or more compartments within the unit dose article.

An issue encountered with such unit-dose articles is that they are susceptible to environmental moisture conditions during storage and transport. When exposed to high humidity conditions, since the film, by virtue, needs to be water-soluble, such encounters with moisture can result in moisture migrating across the film causing the water-soluble unit dose article to turn "floppy" and potentially even premature dissolution of the water-soluble film resulting in premature rupture of the unit dose article and/or unwanted interaction with the detergent composition. When exposed to low humidity conditions, residual moisture in the film or even from the enclosed detergent composition may migrate out of the film resulting in a more brittle film and potentially altering the physical properties including physical stability of the enclosed detergent composition.

A further issue encountered with so-called multi-compartment unit-dose articles is that water might migrate through the film from one compartment to another compartment. This could again impact the physical properties including physical stability of the detergent composition enclosed in the first compartment, as well as the physical properties and potentially the chemical stability of the detergent actives enclosed in the second compartment, especially when those detergent actives in the second compartment are water sensitive such as enzymes and bleaches.

However, any attempt to control water migration through the film must not unduly affect the tensile properties of the film or the intended dissolution of the film during the wash process.

Therefore, there is a continuing need for a water-soluble unit dose article that exhibits reduced moisture migration during transport and storage yet exhibits acceptable tensile properties and intended dissolution during the wash process.

It was surprisingly found that a water-soluble unit dose article according to the present invention achieved this.

SUMMARY OF THE INVENTION

A water-soluble unit dose article comprising a water-soluble film and a detergent composition, wherein, the water-soluble film comprises a water-soluble polymeric resin, wherein the water-soluble polymeric resin comprises, preferably consists of; from 10% to 60%, preferably from 20% to 50%, more preferably from 25% to 40% by weight of the water-soluble polymeric resin of a first polyvinyl alcohol polymer wherein the first polyvinyl alcohol resin is a copolymer of polyvinylalcohol and 1-butene-3,4-diol; and from 40% to 90%, preferably from 50% to 80%, most preferably from 60% to 75% by weight of the water-soluble polymeric resin of a second polyvinyl alcohol polymer, wherein the second polyvinyl alcohol polymer is selected from a polyvinyl alcohol homopolymer, a polyvinylalcohol copolymer comprising an anionic substitution, or a mixture thereof.

BRIEF DESCRIPTION OF THE DRAWINGS

FIG. 1 is a water-soluble unit dose article according to the present invention.

DETAILED DESCRIPTION OF THE INVENTION

Water-Soluble Unit Dose Article

The present invention discloses a water-soluble unit dose article comprising a water-soluble film and a detergent composition. The water-soluble film and the detergent composition are described in more detail below.

The water-soluble unit dose article comprises the water-soluble film shaped such that the unit-dose article comprises at least one internal compartment surrounded by the water-soluble film. The unit dose article may comprise a first water-soluble film and a second water-soluble film sealed to one another such to define the internal compartment. The water-soluble unit dose article is constructed such that the detergent composition does not leak out of the compartment during storage. However, upon addition of the water-soluble unit dose article to water, the water-soluble film dissolves and releases the contents of the internal compartment into the wash liquor.

The compartment should be understood as meaning a closed internal space within the unit dose article, which holds the detergent composition. During manufacture, a first water-soluble film may be shaped to comprise an open compartment into which the detergent composition is added. A second water-soluble film is then laid over the first film in such an orientation as to close the opening of the compartment. The first and second films are then sealed together along a seal region.

The unit dose article may comprise more than one compartment, even at least two compartments, or even at least three compartments. The compartments may be arranged in superposed orientation, i.e. one positioned on top of the other. In such an orientation the unit dose article will comprise three films: top, middle and bottom. Alternatively, the compartments may be positioned in a side-by-side orientation, i.e. one orientated next to the other. The compartments may even be orientated in a 'tyre and rim' arrangement, i.e. a first compartment is positioned next to a second compartment, but the first compartment at least partially surrounds the second compartment but does not completely enclose the second compartment. Alternatively, one compartment may be completely enclosed within another compartment.

Wherein the unit dose article comprises at least two compartments, one of the compartments may be smaller than the other compartment. Wherein the unit dose article comprises at least three compartments, two of the compartments may be smaller than the third compartment, and preferably the smaller compartments are superposed on the larger compartment. The superposed compartments preferably are orientated side-by-side.

In a multi-compartment orientation, the detergent composition may be comprised in at least one of the compartments. It may for example be comprised in just one compartment, or may be comprised in two compartments, or even in three compartments, or even in all available compartments.

Each compartment may comprise the same or different compositions. The different compositions could all be in the same form, or they may be in different forms. The water-soluble unit dose article may comprise at least two internal compartments, wherein the detergent composition is comprised in at least one of the compartments, preferably wherein the unit dose article comprises at least three compartments, wherein the detergent composition is comprised in at least one of the compartments.

FIG. 1 discloses a water-soluble unit dose article (1) according to the present invention. The water-soluble unit dose article (1) comprises a first water-soluble film (2) and a second water-soluble film (3) which are sealed together at a seal region (4). The detergent composition (5) is comprised within the water-soluble soluble unit dose article (1).

Water-Soluble Film

The water-soluble film of the present invention is soluble or dispersible in water. The water-soluble film preferably has a thickness of 20 microns to 150 microns, preferably 35 microns to 125 microns, even more preferably 50 microns to 110 microns, most preferably 76 microns.

Preferably, the water-soluble film has a water-solubility of at least 50%, preferably at least 75% or even at least 95%, as measured by the method set out here after using a glass-filter with a maximum pore size of 20 microns:

5 grams±0.1 gram of film material is added in a pre-weighed 3 L beaker and 2 L±5 ml of distilled water is added. This is stirred vigorously on a magnetic stirrer, Labline model No. 1250 or equivalent and 5 cm magnetic stirrer, set at 600 rpm, for 30 minutes at 30° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated.

The water-soluble film comprises a water-soluble polymeric resin. The water-soluble polymeric resin comprises, preferably consists of;

(a) from 10% to 60%, preferably from 20% to 50%, more preferably from 25% to 40% by weight of the water-soluble polymeric resin of a first polyvinyl alcohol polymer wherein the first polyvinyl alcohol resin is a copolymer of polyvinylalcohol and 1-butene-3,4-diol; and (b) from 40% to 90%, preferably from 50% to 80%, most preferably from 60% to 75% by weight of the water-soluble polymeric resin of a second polyvinyl alcohol polymer, wherein the second polyvinyl alcohol polymer is selected from a polyvinyl alcohol homopolymer, a polyvinylalcohol copolymer comprising an anionic substitution, or a mixture thereof.

Without wishing to be bound by theory, the term "homopolymer" generally includes polymers having a single type of monomeric repeating unit (e.g., a polymeric chain consisting of or consisting essentially of a single monomeric repeating unit). For the particular case of polyvinylalcohol, the term "homopolymer" further includes copolymers having a distribution of vinyl alcohol monomer units and optionally vinyl acetate monomer units, depending on the degree of hydrolysis (e.g., a polymeric chain consisting of or consisting essentially of vinyl alcohol and vinyl acetate monomer units). In the limiting case of 100% hydrolysis, a polyvinylalcohol homopolymer can include a true homopolymer having only vinyl alcohol units.

Without wishing to be bound by theory, the term "copolymer" generally includes polymers having two or more types of monomeric repeating units (e.g., a polymeric chain consisting of or consisting essentially of two or more different monomeric repeating units, whether as random copolymers, block copolymers, etc.). For the particular case of polyvinylalcohol, the term "copolymer" (or "polyvinylalcohol copolymer") further includes copolymers having a distribution of vinyl alcohol monomer units and optionally vinyl acetate monomer units, depending on the degree of hydrolysis, as well as at least one other type of monomeric repeating unit (e.g., a ter- (or higher) polymeric chain consisting of or consisting essentially of vinyl alcohol monomer units, vinyl acetate monomer units, and one or more other monomer units, for example anionic or further nonionic monomer units). In the limiting case of 100% hydrolysis, a polyvinylalcohol copolymer can include a copolymer having vinyl alcohol units and one or more other monomer units, but no vinyl acetate units.

Preferably, the weight percentage of the first polyvinyl alcohol polymer and the second polyvinyl alcohol polymer add up to 100% by weight of the polymeric resin in the water-soluble film. The skilled person in the art will know how to prepare the polymeric resin and each individual polyvinyl alcohol polymer.

The water-soluble polymeric resin is present in the film preferably between 30% and 95%, more preferably between 40% and 80%, most preferably between 50% and 70% by weight of the water-soluble film.

The water-soluble unit dose article according to the invention may comprise at least one water-soluble film according to the invention. Alternatively, the water-soluble unit dose article according to the invention may comprise at least two or even at least three water-soluble films according to the invention. Alternatively, the water-soluble unit dose article according to the invention solely comprises water-soluble films which are according to the invention, i.e. not comprising any water-soluble films outside the scope of the invention. Preferably, water-soluble mono-compartment unit dose articles or water-soluble multi-compartment unit dose articles in which the multiple compartments are in a side by side configuration are created in which both the bottom and top water-soluble films enclosing the individual compartment are water-soluble films according to the invention. Alternatively, either the top or the bottom water-soluble film is according to the invention. Water-soluble unit dose articles may be created with compartments in a superposed configuration. Under this configuration each of the top, bottom and middle water-soluble film(s) can be water-soluble films according to the invention. Alternatively, one, for example, solely the middle water-soluble film or solely the top water-soluble film or solely the bottom water-soluble film, or a combination of any of these water-soluble films can be a water-soluble film according to the invention while the remaining water-soluble film(s) is (are) outside the scope of the invention. Preferably, all water-soluble films comprised within the water-soluble unit dose article are water-soluble films according to the invention. These water-soluble films according to the invention could be chemically and physically the same, or alternatively could be chemically and/or physically different. By "different" we mean the first water-soluble film is intended to have at least one chemical and/or physical characteristic different to that of the second water-soluble film. This characteristic can be by selecting a different polymeric resin, the polymeric resin for example varying in average anionic monomer and/or 1-butene-3,4-diol monomer unit content, average individual polymer solution viscosity, average individual polymer degree of hydrolysis, ratio between the first and the second polyvinyl alcohol polymers, or mixtures thereof. 'Targeted averages' take into consideration the standard polymer variation inherent to any manufacture process. Alternatively, this characteristic can be by varying the relative content of the individual components inside the water-soluble film such as polymeric resin to plasticizer content or water content, or even varying the exact chemistry of the additives. The "different" characteristic is assessed for the starting films prior to deformation, e.g. differences in water-soluble film content as a consequence of a deformation action, exposure to encapsulated detergent composition resulting in exchange of actives between film and the detergent composition, as well as actives exchange with surrounding storage environment are excluded in this assessment.

First Polyvinyl Alcohol Polymer

The first polyvinyl alcohol polymer is a random copolymer of polyvinylalcohol and 1-butene-3,4-diol (BVOH). Preferably, the first polyvinyl alcohol polymer is as according to Formula 1. Within Formula 1, m represents the number of vinyl acetate monomer units which could be as low as zero in case of 100% hydrolysis. n represents the number of vinyl alcohol monomer units and k the number of 1-butene-3,4-diol monomer units within the BVOH copolymer. As stated these three monomer units in Formula 1 are randomly arranged rather than appearing in blocks. Suitable BVOH copolymers can be produced by the copolymerization of vinyl acetate with butene diol followed by hydrolysis.

Formula 1

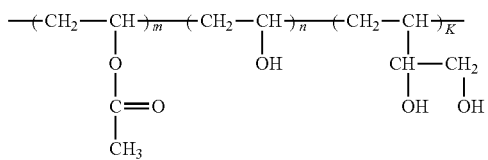

Preferably, the copolymer of polyvinylalcohol and 1-butene-3,4-diol according to the invention has a percentage degree of hydrolysis of from 85% to 100%, preferably from 90% to 100%, more preferably from 95% to 100%, most preferably from 98% to 100%. A person skilled in the art will know how to measure the degree of hydrolysis of a polyvinyl alcohol polymer or copolymer. A suitable test method to measure the degree of hydrolysis is as according to standard method JIS K6726.

Preferably, the first polyvinyl alcohol polymer is a copolymer of polyvinylalcohol and 1-butene-3,4-diol having a 1-butene-3,4-diol monomer unit in a proportion of 1 to 15 mol %, preferably 2 to 10 mol %, most preferably 5 to 10 mol % in the copolymer of polyvinylalcohol and 1-butene-3,4-diol. Those skilled in the art will know how to determine the proportion of 1-butene-3,4-diol monomer using standard known techniques. The amount of 1-butene-3,4-diol monomer content may be accurately determined from H-NMR measurement results. Those skilled in the art will know how to conduct H-NMR analysis using known techniques.

Preferably, the copolymer of polyvinylalcohol and 1-butene-3,4-diol has a viscosity of from 1 to 25 mPas, preferably from 2 to 15 mPas, most preferably from 3 to 10 mPas, wherein the viscosity is measured as a 4% aqueous solution in demineralized water at 20° C. Throughout this invention the viscosity of any polyvinyl alcohol polymer may be determined by measuring a freshly made solution using a Brookfield LV type viscometer with UL adapter as described in British Standard EN ISO 15023-2:2006 Annex E Brookfield Test method. It is standard practice to state the viscosity of 4% aqueous polyvinyl alcohol solutions at 20° C.

Most preferably the first polyvinyl alcohol polymer is a copolymer of polyvinylalcohol and 1-butene-3,4-diol having a percentage degree of hydrolysis of from 98% to 100%, having the 1-butene-3,4-diol monomer unit in a proportion of 5 to 10 mol % in the copolymer of polyvinylalcohol and 1-butene-3,4-diol, and a viscosity of from 3 to 10 mPas as measured as a 4% aqueous solution in demineralized water at 20° C. Without wishing to be bound by theory it is believed that careful control of polymeric size, degree of hydrolysis and degree of butene diol monomer unit insertion results in controlled co-packing with the second polyvinyl alcohol polymer in the film. This enables strong migration control while still maintaining good film dissolution and tensile properties.

Copolymers of polyvinylalcohol and 1-butene-3,4-diol can be commercially obtained including the Nichigo G-polymers line-up manufactured by the Nippon Gohsei USA Co, Ltd. (La Porte, Tex., United States of America).

Second Polyvinyl Alcohol Polymer

The second polyvinyl alcohol polymer is selected from a polyvinyl alcohol homopolymer, a polyvinyl alcohol copolymer comprising an anionic substitution, or a mixture thereof.

The second polyvinyl alcohol polymer may be a polyvinyl alcohol homopolymer having a percentage degree of hydrolysis of from 75% to 100%, preferably of from 80% to 95%, most preferably of from 85% to 90%, and a viscosity measured of from 1 to 30 mPas, preferably from 5 to 25 mPas, most preferably from 10 to 20 mPas, wherein the viscosity is measured as a 4% aqueous solution in demineralized water at 20° C.

Preferably, when the second polyvinyl alcohol polymer is a polyvinyl alcohol homopolymer, most preferably the polymer resin of the water-soluble film according to the invention consists of from 25% to 40% by weight of the water-soluble polymeric resin of a first polyvinyl alcohol polymer which is a copolymer of polyvinylalcohol and 1-butene-3, 4-diol having a degree of hydrolysis (%) of from 98% to 100% and having the 1-butene-3,4-diol monomer unit in a proportion of 5 to 10 mol % in the copolymer of polyvinylalcohol and 1-butene-3,4-diol, and a viscosity of from 3 to 10 mPas as measured as a 4% aqueous solution in demineralized water at 20° C.; and from 60% to 75% by weight of the water-soluble polymeric resin of a second polyvinyl alcohol polymer which is a homopolymer with a percentage degree of hydrolysis of from 85% to 90% and a viscosity of from 10 to 20 mPas as measured as a 4% aqueous solution in demineralized water at 20° C. Suitable polyvinyl alcohol homopolymers could be obtained from Sigma Aldrich under the Mowiol tradename.

The second polyvinyl alcohol polymer may be a polyvinyl alcohol copolymer comprising an anionic substitution. The anionic substitution may be selected from a sulphonate, a carboxylate, or a mixture thereof. General classes of anionic monomer units which can be used for the second polyvinyl alcohol polymer include the vinyl polymerization units corresponding to monocarboxylic acid vinyl monomers, their esters and anhydrides, dicarboxylic monomers having a polymerizable double bond, their esters and anhydrides, vinyl sulfonic acid monomers, and alkali metal salts of any of the foregoing. Examples of suitable anionic monomer units include the vinyl polymerization units corresponding to vinyl anionic monomers including vinyl acetic acid, maleic acid, monoalkyl maleate, dialkyl maleate, monomethyl maleate, dimethyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sufoethyl acrylate, alkali metal salts of the foregoing (e.g., sodium, potassium, or other alkali metal salts), esters of the foregoing (e.g., methyl, ethyl, or other C1-C4 or C6 alkyl esters), and combinations thereof (e.g., multiple types of anionic monomers or equivalent forms of the same anionic monomer). The anionic monomer may be one or more acrylamido methylpropanesulfonic acids (e.g., 2-acrylamido-1-methylpropanesulfonic acid, 2-acrylamido-2-methylpropanesulfonic acid, 2-methylacrylamido-2-methylpropanesulfonic acid), alkali metal salts thereof (e.g., sodium salts), and combinations thereof. Preferably the anionic substitution is selected from a carboxylate, even more preferably an acrylate, a methacrylate, a maleate, or a mixture thereof, most preferably an acrylate.

Preferably, the degree of anionic substitution is in a proportion of 1 to 15 mol %, preferably 1.5 to 10 mol %, most preferably 2 to 5 mol % in the anionic polyvinyl alcohol copolymer, wherein the anionic polyvinyl alcohol copolymer has a percentage degree of hydrolysis of from 75% to 100%, preferably from 85% to 100%, most preferably between 95% to 100%, and a viscosity of from 1 to 30 mPas, preferably from 5 to 25 mPas, most preferably from 10 to 25 mPas as measured as a 4% aqueous solution in demineralized water at 20° C. The amount of anionic monomer content of a polyvinyl alcohol copolymer may be accurately determined from H-NMR measurement results.

Preferably, when the second polyvinyl alcohol polymer is a polyvinyl alcohol copolymer comprising an anionic substitution, the polymer resin of the water-soluble film according to the invention most preferably consists of from 25% to 40% by weight of the water-soluble polymeric resin of a first polyvinyl alcohol polymer which is a copolymer of polyvinylalcohol and 1-butene-3,4-diol having a degree of hydrolysis (%) of from 98% to 100% and having the 1-butene-3,4-diol monomer unit in a proportion of 5 to 10 mol % in the copolymer of polyvinylalcohol and 1-butene-3,4-diol, and a viscosity of from 3 to 10 mPas as measured as a 4% aqueous solution in demineralized water at 20° C.; and from 60% to 75% by weight of the water-soluble polymeric resin of a second polyvinyl alcohol polymer which is a polyvinyl alcohol copolymer comprising an anionic substitution;
  i) the anionic substitution is selected from an acrylate;
  ii) the degree of anionic substitution is from 2 to 5 mol % in the anionic polyvinyl alcohol copolymer; and
  iii) the polyvinyl alcohol comprising an anionic substitution has a percentage degree of hydrolysis of from 95% to 100%; and
  iv) the polyvinyl alcohol copolymer comprising an anionic substitution has a viscosity of from 10 to 25 mPas, wherein the viscosity is measured as a 4% aqueous solution in demineralized water at 20° C.

An especially suitable polyvinyl alcohol copolymer as a second polyvinyl alcohol polymer is the carboxylated polyvinyl alcohol copolymer used in M8630 water-soluble film, as commercially available from the MonoSol company. Alternative commercially available films comprising suitable anionic polyvinyl alcohol polymeric resins are available from Nippon Gohsei or Aicello.

Alternatively, the second polyvinyl alcohol polymer is a 90/10 to 10/90, preferably an 80/20 to 20/80, most preferably a 70/30 to 30/70 blend by weight of the second polyvinyl alcohol polymer of a polyvinyl alcohol homopolymer and a polyvinyl alcohol copolymer comprising an anionic substitution. Herein, the polyvinyl alcohol homopolymer preferably has a percentage degree of hydrolysis of from 75% to 100%, preferably of from 80% to 95%, most preferably of from 85% to 90%, and a viscosity of from 1 to 30 mPas, preferably from 5 to 25 mPas, most preferably from 10 to 25 mPas as measured as a 4% aqueous solution in demineralized water at 20° C. The anionic polyvinyl alcohol copolymer preferably has an anionic substitution selected from a sulphonate, a carboxylate, or a mixture thereof. General classes of anionic monomer units which can be used for the anionic copolymer of the second polyvinyl alcohol polymer include the vinyl polymerization units corresponding to monocarboxylic acid vinyl monomers, their esters and anhydrides, dicarboxylic monomers having a polymerizable double bond, their esters and anhydrides, vinyl sulfonic acid monomers, and alkali metal salts of any of the foregoing. Examples of suitable anionic monomer units include the vinyl polymerization units corresponding to vinyl anionic monomers including vinyl acetic acid, maleic acid, monoalkyl maleate, dialkyl maleate, monomethyl maleate, dimethyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sufoethyl acrylate, alkali metal salts of the foregoing (e.g., sodium, potassium, or other alkali metal salts), esters of the foregoing (e.g., methyl, ethyl, or other C1-C4 or C6 alkyl esters), and combinations thereof (e.g., multiple types of anionic monomers or equivalent forms of the same anionic monomer). The anionic monomer may be one or more acrylamido methylpropanesulfonic acids (e.g., 2-acrylamido-1-methylpropanesulfonic acid, 2-acrylamido-2-methylpropanesulfonic acid, 2-methylacrylamido-2-methylpropanesulfonic acid), alkali metal salts thereof (e.g., sodium salts), and combinations thereof. More preferably the anionic substitution is a carboxylate, even more preferably an acrylate, a methacrylate, a maleate, or a mixture thereof, most preferably a maleate, and the degree of anionic substitution being in a proportion of 1 to 15 mol %, preferably 1.5 to 10 mol %, most preferably 2 to 5 mol % in the anionic polyvinyl alcohol copolymer, wherein the anionic polyvinyl alcohol has a percentage degree of hydrolysis (%) of from 75% to 99%, preferably from 80% to 95%, most preferably between 85% to 95%, and a viscosity measured of from 1 to 30 mPas, preferably from 5 to 25 mPas, most preferably from 10 to 25 mPas as a 4% aqueous solution in demineralized water at 20° C.

Preferably, when the second polyvinyl alcohol polymer is a blend of a polyvinyl alcohol homopolymer and an anionic polyvinyl alcohol copolymer, the polymer resin of the water-soluble film according to the invention consists of from 25% to 40% by weight of the water-soluble polymeric resin of a first polyvinyl alcohol polymer which is a copolymer of polyvinylalcohol and 1-butene-3,4-diol having a degree of hydrolysis (%) of from 98% to 100% and having the 1-butene-3,4-diol monomer unit in a proportion of 5 to 10 mol % in the copolymer of polyvinylalcohol and 1-butene-3,4-diol, and a viscosity of from 3 to 10 mPas as measured as a 4% aqueous solution in demineralized water at 20° C.; and from 60% to 75% by weight of the water-soluble polymeric resin of a second polyvinyl alcohol polymer which is a 70/30 to 30/70 blend by weight of the second polyvinyl alcohol polymer of a polyvinyl alcohol homopolymer and an anionic polyvinyl alcohol copolymer wherein;
   a. the polyvinyl alcohol homopolymer has a percentage degree of hydrolysis of from 85% to 90%, and a viscosity of from 10 to 25 mPas, wherein the viscosity is measured as a 4% aqueous solution in demineralized water at 20° C.; and
   b. the anionic polyvinyl alcohol copolymer has an anionic substitution selected from a maleate; and
      i. the degree of anionic substitution being in a proportion of 2 to 5 mol % in the anionic polyvinyl alcohol copolymer; and
      ii. wherein the anionic polyvinyl alcohol has a percentage degree of hydrolysis (%) of from 85% to 95%; and
      iii. a viscosity of from 10 to 25 mPas, wherein the viscosity is measured as a 4% aqueous solution in demineralized water at 20° C.

The water-soluble film according to the invention can contain auxiliary agents and processing agents, such as, but not limited to plasticizers, plasticizer compatibilizers, surfactants, lubricants, release agents, fillers, extenders, cross-linking agents, antiblocking agents, antioxidants, detackifying agents, antifoams, nanoparticles such as layered silicate-type nanoclays (e.g., sodium montmorillonite), bleaching agents (e.g., sodium metabisulfite, sodium bisulfite or others), aversive agents such as bitterants (e.g., denatonium salts such as denatonium benzoate, denatonium saccharide, and denatonium chloride; sucrose octaacetate; quinine; flavonoids such as quercetin and naringen; and quassinoids such as quassin and brucine) and pungents (e.g., capsaicin, piperine, allyl isothiocyanate, and resinferatoxin), and other functional ingredients, in amounts suitable for their intended purposes.

Preferably the water-soluble film according to the invention comprises one or more plasticizers in an amount in a range of between 5% and 50%, preferably between 10% and 40%, most preferably between 20% and 30% by weight of the water-soluble film. Suitable plasticisers include those selected from polyols, sugar alcohols, or a mixture thereof. Suitable polyols include polyols selected from the group consisting of glycerol, diglycerin, ethylene glycol, diethylene glycol, triethyleneglycol, tetraethylene glycol, polyethylene glycols up to 400 MW, neopentyl glycol, 1,2-propylene glycol, 1,3-propanediol, dipropylene glycol, polypropylene glycol, 2-methyl-1,3-propanediol, trimethylolpropane and polyether polyols, or a mixture thereof. Suitable sugar alcohols include sugar alcohols selected from the group consisting of isomalt, maltitol, sorbitol, xylitol, erythritol, adonitol, dulcitol, pentaerythritol and mannitol, or a mixture thereof. A preferred plasticizer is glycerin, sorbitol, triethyleneglycol, 1,2-propylene glycol, dipropylene glycol, 2-methyl-1,3-propanediol, trimethylolpropane, or a combination thereof. One particularly suitable plasticizer system includes a blend of glycerol, sorbitol and trimethylol propane. Another particularly suitable plasticizer system includes a blend of glycerin, dipropylene glycol, and sorbitol.

Preferably, the water-soluble film according to the invention comprises a surfactant. Suitable surfactants can include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkyl-betaines and sulfobetaines (zwitterionics). Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof. Preferably, the amount of surfactant in any individual water-soluble film is in a range of from 0.1% to 2.5%, preferably from 1% to 2% by weight of the water-soluble film.

Preferably the water-soluble film according to the invention comprises lubricants/release agents. Suitable lubricants/release agents can include, but are not limited to, fatty acids and their salts, fatty alcohols, fatty esters, fatty amines, fatty amine acetates and fatty amides. Preferred lubricants/release agents are fatty acids, fatty acid salts, and fatty amine acetates. the amount of lubricant/release agent in the water-soluble film is in a range of from 0.02% to 1.5%, preferably from 0.1% to 1% by weight of the water-soluble film.

Preferably, the water-soluble film comprises fillers, extenders, antiblocking agents, detackifying agents or a mixture thereof. Suitable fillers, extenders, antiblocking agents, detackifying agents or a mixture thereof include, but are not limited to, starches, modified starches, crosslinked polyvinylpyrrolidone, crosslinked cellulose, microcrystalline cellulose, silica, metallic oxides, calcium carbonate, talc and mica. Preferred materials are starches, modified starches and silica. Preferably, the amount of filler, extender, antiblocking agent, detackifying agent or mixture thereof in the water-soluble film is in a range of from 0.1% to 25%, preferably from 1% to 10%, more preferably from 2% to 8%, most preferably from 3% to 5% by weight of the water-soluble film. In the absence of starch, one preferred range for a suitable filler, extender, antiblocking agent, detackifying agent or mixture thereof is from 0.1% to 1%, preferably 4%, more preferably 6%, even more preferably from 1% to 4%, most preferably from 1% to 2.5%, by weight of the water-soluble film.

Preferably the water-soluble film according to the invention has a residual moisture content of at least 4%, more preferably in a range of from 4% to 15%, even more preferably of from 5% to 10% by weight of the water-soluble film, as measured by Karl Fischer titration.

Preferably the water-soluble film according to the invention comprises an aversive agent, preferably a bittering agent. Suitable bittering agents include, but are not limited to, naringin, sucrose octaacetate, quinine hydrochloride, denatonium benzoate, or mixtures thereof. Any suitable level of aversive agent may be used in the film. Suitable levels include, but are not limited to, 1 ppm to 5000 ppm, or even 100 ppm to 2500 ppm, or even 250 ppm to 2000 rpm.

The water-soluble film according to the invention may be opaque, transparent or translucent. The water-soluble film according to the invention may comprise a printed area. The area of print may be achieved using standard techniques, such as flexographic printing or inkjet printing.

The water-soluble film or water-soluble unit dose article according to the invention or both may be coated with a lubricating agent. Preferably, the lubricating agent is selected from talc, zinc oxide, silicas, siloxanes, zeolites, silicic acid, alumina, sodium sulphate, potassium sulphate, calcium carbonate, magnesium carbonate, sodium citrate, sodium tripolyphosphate, potassium citrate, potassium tripolyphosphate, calcium stearate, zinc stearate, magnesium stearate, starch, modified starches, clay, kaolin, gypsum, cyclodextrins or mixtures thereof.

Method of Making Film

The water-soluble film according to the invention may be formed by admixing, co-casting, or welding the first and the second polyvinyl alcohol polymer according to the types and amounts described herein, together with the preferred and optional secondary additives described herein. If the polymers are first admixed then the water-soluble film is preferably formed by casting the resulting admixture (e.g., along with other plasticizers and other additives) to form a film. If the polymers are welded, the water-soluble film can be formed by, for example, solvent or thermal welding. Another contemplated class of embodiments is characterized by the water-soluble film being formed by extrusion, for example, blown extrusion. Most preferably the water-soluble films according to the invention are prepared by solvent casting.

Optionally, each individual water-soluble film can be a free-standing film consisting of one layer or a plurality of like layers, preferably one layer.

Detergent Composition

The detergent composition may be a laundry detergent composition, an automatic dishwashing composition, a hard surface cleaning composition or a combination thereof. The detergent composition may comprise a solid, a liquid, or a mixture thereof. The term liquid includes a gel, a solution, a dispersion, a paste or a mixture thereof.

By powder we herein mean the detergent composition may comprise solid particulates or may be a single homogenous solid. Preferably, the powder detergent composition comprises particles. This means the powder detergent composition comprises individual solid particles as opposed to the solid being a single homogenous solid. The particles may be free-flowing or may be compacted, preferably free-flowing.

Preferably, the detergent composition is a laundry detergent composition, most preferably a liquid laundry detergent composition.

The laundry detergent composition can be used in a fabric hand wash operation or may be used in an automatic machine fabric wash operation, preferably an automatic machine fabric wash operation.

The laundry detergent composition comprises a non-soap surfactant, wherein the non-soap surfactant comprises an anionic non-soap surfactant and a non-ionic surfactant. Preferably, the laundry detergent composition comprises between 10% and 60%, more preferably between 20% and 55% by weight of the laundry detergent composition of the non-soap surfactant.

The weight ratio of non-soap anionic surfactant to non-ionic surfactant is from 1:1 to 20:1, preferably from 3:1 to 17.5:1, more preferably from 5:1 to 15:1, most preferably from 7.5:1 to 12.5:1.

The non-soap anionic surfactant comprises linear alkylbenzene sulphonate, alkyl sulphate or a mixture thereof. The weight ratio of linear alkylbenzene sulphonate to alkyl sulphate is from 1:2 to 9:1, preferably from 1:1 to 7:1, more preferably from 1.25:1 to 5:1, most preferably from 1.4:1 to 3:1.

Exemplary linear alkylbenzene sulphonates are $C_{10}$-$C_{16}$ alkyl benzene sulfonic acids, or $C_{11}$-$C_{14}$ alkyl benzene sulfonic acids. By 'linear', we herein mean the alkyl group is linear. Alkyl benzene sulfonates are well known in the art.

The alkyl sulphate anionic surfactant may comprise alkoxylated alkyl sulphate or non-alkoxylated alkyl sulphate or a mixture thereof. The alkoxylated alkyl sulphate anionic surfactant preferably is an ethoxylated alkyl sulphate anionic surfactant.

The alkyl sulphate anionic surfactant may comprise an ethoxylated alkyl sulphate anionic surfactant, preferably with a mol average degree of ethoxylation from 1 to 5, more preferably from 1 to 3, most preferably from 2 to 3.

The alkyl sulphate anionic surfactant may comprise a non-ethoxylated alkyl sulphate and an ethoxylated alkyl sulphate wherein the mol average degree of ethoxylation of the alkyl sulphate anionic surfactant is from 1 to 5, more preferably from 1 to 3, most preferably from 2 to 3.

The alkyl fraction of the alkyl sulphate anionic surfactant can preferably be derived from fatty alcohols, oxo-synthesized alcohols, guerbet alcohols, or mixtures thereof.

Preferably, the laundry detergent composition comprises between 10% and 50%, more preferably between 15% and 45%, even more preferably between 20% and 40%, most preferably between 30% and 40% by weight of the laundry detergent composition of the non-soap anionic surfactant.

Preferably, the non-ionic surfactant is selected from alcohol alkoxylate, an oxo-synthesised alcohol alkoxylate, Guerbet alcohol alkoxylates, alkyl phenol alcohol alkoxylates or a mixture thereof.

The laundry detergent composition comprises between 0.01% and 10%, preferably between 0.01% and 8%, more preferably between 0.1% and 6%, most preferably between 0.15% and 5% by weight of the liquid laundry detergent composition of a non-ionic surfactant.

Preferably, the laundry detergent composition comprises between 1.5% and 20%, more preferably between 2% and 15%, even more preferably between 3% and 10%, most preferably between 4% and 8% by weight of the laundry detergent composition of soap, preferably a fatty acid salt, more preferably an amine neutralized fatty acid salt, wherein preferably the amine is an alkanolamine more preferably selected from monoethanolamine, diethanolamine, triethanolamine or a mixture thereof, more preferably monoethanolamine.

Preferably, the laundry detergent composition is a liquid laundry detergent composition, more preferably the liquid laundry detergent composition comprises less than 15%, more preferably less than 12% by weight of the liquid laundry detergent composition of water.

Preferably, the laundry detergent composition is a liquid laundry detergent composition comprising a non-aqueous solvent selected from 1,2-propanediol, dipropylene glycol, tripropyleneglycol, glycerol, sorbitol, polyethylene glycol or a mixture thereof. Preferably, the liquid laundry detergent composition comprises between 10% and 40%, preferably between 15% and 30% by weight of the liquid laundry detergent composition of the non-aqueous solvent.

Preferably the laundry detergent composition comprises a perfume.

Preferably, the laundry detergent composition comprises an adjunct ingredient selected from the group comprising builders including enzymes, citrate, bleach, bleach catalyst, dye, hueing dye, brightener, cleaning polymers including alkoxylated polyamines and polyethyleneimines, soil release polymer, surfactant, solvent, dye transfer inhibitors, chelant, encapsulated perfume, polycarboxylates, structurant, pH trimming agents, and mixtures thereof.

Those skilled in the art will know how to formulate and make a suitable detergent composition using known knowledge and techniques. The detergent composition may comprise common detergent ingredients including surfactants, polymers, bleach, enzymes, perfumes, dyes, structing agents, fillers, water or a mixture thereof.

Those skilled in the art will be aware of known techniques to make a water-soluble unit dose article according to the present invention.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

EXAMPLES

Test Methods:
1. Film Disintegration Time:
   The cold water solubility profile of the different polyvinyl alcohol based water-soluble films has been determined following the MSTM205 Disintegration/Dissolution protocol, executed in 10° C. demineralized water.
2. Tensile Stress at 100% Strain:
   The water-soluble film test samples were analyzed for tensile stress at 100% strain as follows. The procedure includes the determination of tensile stress at 100% strain according to ASTM D 882 ("Standard Test Method for Tensile Properties of Thin Plastic Sheeting"). An INSTRON tensile testing apparatus (Model 5544 Tensile Tester or equivalent—Instron Industrial Products, 825 University Ave., Norwood, Mass. 02062-2643) was used for the collection of film data. Five test specimens, each cut with reliable cutting tools (e.g. JDC precision sample cutter, Model 1-10, from Thwing Albert Instrument Company, Philadelphia, Pa. U.S.A.) to ensure dimensional stability and reproducibility, were tested. Water-soluble films were preconditioned to testing environmental conditions for 24 h. Tests were conducted in the standard laboratory atmosphere of 25° C. and 33% relative humidity. 1"-wide (2.54 cm) samples of a single film sheet having a thickness of 3.0±0.15 mil (or 76.2±3.8 μm) were prepared. The sample was then transferred to the INSTRON tensile testing machine to proceed with testing. The tensile testing machine was prepared according to manufacturer instructions, equipped with a 500 N load cell, and calibrated. The correct grips and faces were fitted (INSTRON grips having model number 2702-032 faces, which are rubber coated and 25 mm wide, or equivalent). The samples were mounted into the tensile testing machine, elongated at a rate of 1 N/min, and analyzed to determine the stress-strain curve. The stress at 100% strain is extracted from the stress-strain curve, e.g. this data is the stress needed to apply to the specimen to duplicate the length between the Instron® equipment clamps. The average of five test specimens was calculated and reported.
3. Water Vapor Permeability:
   Water Vapor Permeability (WVP) was measured using a Dynamic Vapor Sorption (DVS)
   Instrument. The ASTM E96-95 standard method was used to examine the WVP of the composite and blend films. The tests were run using a SPSx-1μ High Load Dynamic Vapor Sorption analyzer supplied by ProUmid. The DVS uses gravimetry for determination of moisture sorption/desorption and is fully automated. The basic operation principle of a sorption analyzer is to measure the change in mass of a sample that is kept in an environment of controlled constant temperature and relative humidity (RH). Change in mass takes place either by water sorption from the surrounding air to the sample or water desorption from the sample.

The equipment is basically a relative humidity controlled and temperature controlled chamber, wherein a 6 pan carousel is placed which allows up to 5 film samples to be tested plus an empty reference cup. A desiccant (~3 g to cover bottom of the pan-type: Roth, Molecular sieve 3 Å, 0.3 mm Type 564, pearl-form) is placed in the measuring cup leaving an air gap between it and the cup closing film material. Each pan has an Aluminum ring with screws, designed to fix the films. A piece of film is placed onto a pan and after gentle stretching, the ring is placed on top and the film is tightly fixed with the screws and excess film is removed. The film covering the pan surface has an 80 mm diameter.

The temperature is fixed at 20° C. The relative humidity (RH) is set at 35% for 6 hours, and then raised in 1 step (takes 6 min for plateauing the RH) onto 50%. The RH remains at 50% for 12 hours then decreases in 1 step back to 35% plateauing within 6 min. The total duration of the measurement is 18 hours. There is no prior pre-conditioning of the films as the DVS runs 6 hours at 35% RH as preconditioning step.

The cycle time (=time between measuring each pan) is set to 5 min and the DVS records each weight result vs. time and calculates automatically the % Dm (relative mass variation versus starting weight of the film). The Water Vapor Permeability (at 50% RH during the fixed time of 12 hours at 20° C.) is calculated by using the slope of % Dm vs time, by difference of the value % Dm at 50% RH (last one before going back to 35% RH) minus % Dm at 35% RH (last one before going up to 50% RH). These values are inserted in the following formula to calculate the Water Vapor Permeability.

$$WVP = \frac{Mass * Thickness * 24}{Time * Area * \Delta Vapor\ Pressure} = \frac{m*T*24}{t*A*S(R1-R2)} = [gPa^{-1}day^{-1}m^{-1}]$$

Herein m is the mass variation in [g] over a time period tin [hour], the thickness of the film is expressed in [m], the area of interface contact between the film and the atmosphere is in [m$^2$] and the ΔVapor Pressure it is equivalent to the saturation vapor pressure at test temperature S [e.g. S{20° C.}=2338.8 Pa] multiplied by the difference of the relative humidity at the source expressed as a fraction (e.g. R1=0.5) and R2, the relative humidity inside the cup expressed as a fraction (R2=0). Lower Water Vapor Permeability values indicate a higher barrier against water transport through the film and as such are most preferred.

Film Sample Preparation:
   Film samples are prepared through a benchtop solvent casting process using a casting knife:
   Starting Materials:
   a. copolymer of polyvinylalcohol and 1-butene-3,4-diol: Nichigo G-polymer (grade BCE8049Q: dH>99%, 4% viscosity: 4.5, BVOH content 6 mol % per P&G H-NMR analysis), available from Nippon Gohsei
   b. M8630—commercial water-soluble film comprising polyvinyl alcohol/monocarboxylate copolymer resin, available from MonoSol.
   c. PVOH copolymer with anionic substitution/PVOH homopolymer blend: water-soluble film comprising 60/40-70/30 blend of a polyvinyl alcohol homopolymer (13-23 cps, dH: 85-87%)/polyvinyl alcohol—maleate copolymer (15-20cps, dH: 89-91%, 4% maleate by weight of copolymer)—total resin presence: 64-66% by weight of water-soluble film, received from Mono-Sol d. PVOH homopolymer resin: Mowiol 18/88 from Sigma Aldrich Film Preparation Process:

a. Polymer resin/water-soluble film (cut in small pieces) mixtures are dosed in targeted polymer ratio in distilled water to prepare a 20% in weight aqueous total polymer solution. The mixture is heated at 80° C. while stirring (350 rpm) for 3 hours in a 50 ml glass bottle with plastic lid to secure full dissolution. When starting from polymeric resin, also 20% by weight of the polymeric resin of a glycerol plasticizer is added to the aqueous mixture.

b. After the 3 hours, the homogeneous solution was poured onto a glass support and a casting knife was used to spread the solution into a thin layer.

c. The resulting film was left at ambient condition (22° C.—35% RH) for 1 hour prior to placing it in a dry oven at 80° C. for 3 hours.

d. The dried film was taken out from the oven and kept at ambient condition for 1 more hour prior to peeling it off from the support.

e. Pure M8630 and mixed anionic PVOH copolymer/PVOH homopolymer based water-soluble starting films have also been re-casted following process above to allow for single variable film property comparison.

Test Results (N. A.*=Not Tested)

Film disintegration time, tensile stress at 100% strain and water vapor permeability test results have been summarized in table 1 for a range of mixed BVOH (first polymer according to the invention)—PVOH (co-) polymer (second polymer according to the invention) systems according to the invention as well as the pure BVOH (first polymer) and (nil BVOH) PVOH (co-) polymer (second polymer) reference systems (REF 1-4) outside the scope of the invention.

The data in Table 1 clearly show that the mixed copolymer of polyvinylalcohol and 1-butene-3,4-diol (BVOH)—PVOH (co-) polymer systems according to the invention have an improved water vapor permeability profile compared to the individual BVOH (first polymer) and (nil BVOH) PVOH (co-)polymer (second polymer) reference systems. This improved water barrier property does not come at the expense of film rupture upon dilution in water nor at the expense of film tensile properties for which comparable values are retrieved.

TABLE 1

| Film types | DISINTEGRATION TIME [s] | STRESS AT 100% STRAIN [MPa] | WATER VAPOR PERMEABILITY 10-06 [g/Pa m day] |
|---|---|---|---|
| REF 1: 100% RECASTED M8630 | 42 | 17 | 4.2 |
| M8630/G-Polymer (60:40) | 41 | 23 | 0.6 |
| M8630/G-Polymer (65:35) | 38 | 23 | 1.3 |
| M8630/G-Polymer (70:30) | 39 | 21 | 1.4 |
| M8630/G-Polymer (75:25) | 38 | 18 | 1.6 |
| M8630/G-Polymer (80:20) | 38 | 17 | 2.1 |
| REF 2: 100% G-polymer | N.A.* | 11 | 3.4 |
| REF 3: 100% RECASTED anionic PVOH copolymer/PVOH homopolymer blend | 38 | 13 | 5.1 |
| anionic PVOH copolymer/PVOH homopolymer blend /G-Polymer (65:35) | 38 | 20 | 1.1 |
| anionic PVOH copolymer/PVOH homopolymer blend /G-Polymer (70:30) | 38 | 16 | 1.2 |
| anionic PVOH copolymer/PVOH homopolymer blend /G-Polymer (75:25) | 35 | 15 | 1.8 |
| anionic PVOH copolymer/PVOH homopolymer blend /G-Polymer (80:20) | 35 | 16 | 2.2 |
| REF 2: 100% G-polymer | N.A. | 11 | 3.4 |
| REF 4: 100% Mowiol 18-88 | N.A | N.A | 6.1 |
| Mowiol 18-88/G-Polymer (65:35) | N.A | N.A | 1.2 |
| Mowiol 18-88/G-Polymer (70:30) | N.A | N.A | 1.8 |
| Mowiol 18-88/G-Polymer (75:25) | N.A | N.A | 2.2 |
| Mowiol 18-88/G-Polymer (80:20) | N.A | N.A | 2.4 |
| REF 2: 100% G-Polymer | N.A | 11 | 3.4 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

What is claimed is:

1. A water-soluble unit dose article comprising a water-soluble film and a detergent composition,
wherein the water-soluble film comprises a water-soluble polymeric resin, wherein the water-soluble polymeric resin comprises:
from about 20% to about 40% by weight of the water-soluble polymeric resin of a first polyvinyl alcohol polymer, wherein the first polyvinyl alcohol polymer is a copolymer of polyvinylalcohol and 1-butene-3,4-diol; and from about 60% to about 80% by weight of the water-soluble polymeric resin of a second polyvinyl alcohol polymer, wherein the second polyvinyl alcohol polymer is selected from polyvinyl alcohol homopolymer, a polyvinylalcohol copolymer comprising an anionic substitution, or a mixture thereof.

2. The water-soluble unit dose article according to claim 1 wherein the copolymer of polyvinylalcohol and 1-butene-3,4-diol has a percentage degree of hydrolysis, as measured according to standard method JIS K6726, of from about 85% to about 100%.

3. The water-soluble unit dose article according to claim 1 wherein the copolymer of polyvinylalcohol and 1-butene-3,4-diol has a 1-butene-3,4-diol monomer unit in a proportion of about 1 to about 15 mol %.

4. The water-soluble unit dose articles according to claim 3 wherein the 1-butene-3,4-diol monomer unit is in a proportion of about 2 to about 10 mol % in the copolymer of polyvinylalcohol and 1-butene-3,4-diol.

5. The water-soluble unit dose article according to claim 1 wherein the copolymer of polyvinylalcohol and 1-butene-3,4-diol has a viscosity of from about 1 to about 25 mPas, wherein the viscosity is measured as about a 4% aqueous solution in demineralized water at about 20° C.

6. The water-soluble unit dose article according to claim 1 wherein the second polyvinyl alcohol polymer is a polyvinyl alcohol homopolymer having a percentage degree of hydrolysis, as measured according to standard method JIS K6726, of from about 75% to about 100%, and a viscosity of from about 1 to about 30 mPas, wherein the viscosity is measured as about a 4% aqueous solution in demineralized water at about 20° C.

7. The water-soluble unit dose article according to claim 1, wherein the second polyvinyl alcohol polymer is a polyvinyl alcohol copolymer comprising an anionic substitution, wherein the anionic substitution is selected from a sulphonate, a carboxylate, or a mixture thereof; and
wherein the degree of anionic substitution is from about 1 to about 15 mol % in the anionic polyvinyl alcohol copolymer; and
wherein the polyvinyl alcohol comprising an anionic substitution has a percentage degree of hydrolysis, as measured according to standard method JIS K6726, of from about 75% to about 100%; and
the polyvinyl alcohol copolymer comprising an anionic substitution has a viscosity of from about 1 to about 30 mPas, wherein the viscosity is measured as about a 4% aqueous solution in demineralized water at about 20° C.

8. The water-soluble unit dose article according to claim 7, wherein the anionic substitution is an carboxylate, wherein the carboxylate is selected from an acrylate, a methacrylate, a maleate, or a mixture thereof.

9. The water-soluble unit dose article according to claim 1 wherein the second polyvinyl alcohol polymer is about 90/10 to about 10/90 blend by weight of the second polyvinyl alcohol polymer of a polyvinyl alcohol homopolymer and an anionic polyvinyl alcohol copolymer, wherein:
a. the polyvinyl alcohol homopolymer has a percentage degree of hydrolysis of from about 75% to about 100%, as measured according to standard method JIS K6726, and a viscosity of from about 1 to about 30 mPas, wherein the viscosity is measured as a about 4% aqueous solution in demineralized water at about 20° C.; and
b. the anionic polyvinyl alcohol copolymer has an anionic substitution selected from a sulphonate, a carboxylate, or a mixture thereof; and
i. the degree of anionic substitution being in a proportion of about 1 to about 15 mol % in the anionic polyvinyl alcohol copolymer; and
ii. wherein the anionic polyvinyl alcohol has a percentage degree of hydrolysis (%), as measured according to standard method JIS K6726, of from about 75% to about 99%; and
iii. a viscosity of from about 1 to about 30 mPas, wherein the viscosity is measured as a 4% aqueous solution in demineralized water at about 20° C.

10. The water-soluble unit dose article according to claim 9, wherein the carboxylate is selected from an acrylate, a methacrylate, a maleate, or a mixture thereof.

11. The water-soluble unit dose article according to claim 1, wherein the water-soluble polymeric resin is present in the film at a level between about 30% and about 95%, by weight of the water-soluble film.

12. The water-soluble unit dose article according to claim 11, wherein the water-soluble polymeric resin is present in the film at a level between about 40% and about 80%, by weight of the water-soluble film.

13. The water-soluble unit dose article according to claim 1 wherein the water-soluble film further comprises one or more plasticizers in an amount between about 5% and about 50%, by weight of the water-soluble film.

14. The water-soluble unit dose article according to claim 1 wherein the water-soluble film further comprises one or more surfactants in an amount between about 0.1% to about 2.5%, by weight of the water-soluble film.

15. The water-soluble unit dose article according to claim 1 wherein the water-soluble film further comprises a residual moisture content of at least about 4% by weight of the film.

16. The water-soluble unit dose article according to claim 15, wherein the water-soluble film further comprises a residual moisture content of from about 4% to about 15%, by weight of the film.

17. The water-soluble unit dose article according to claim 1 wherein the detergent composition is a liquid, a solid, or a mixture thereof.

18. The water-soluble unit dose article according to claim 1 wherein the detergent composition comprises a non-soap surfactant, wherein the non-soap surfactant is selected from anionic non-soap surfactants, non-ionic surfactants, or a mixture thereof.

19. The water-soluble unit dose article according to claim 1 wherein the detergent composition comprises less than about 15%, by weight of the detergent composition, of water.

20. The water-soluble unit dose article according to claim 1 wherein the detergent composition comprises between about 10% and about 40%, by weight of the detergent composition of a non-aqueous solvent.

* * * * *